United States Patent
Hashimoto et al.

(10) Patent No.: US 12,485,886 B2
(45) Date of Patent: Dec. 2, 2025

(54) VEHICLE

(71) Applicant: TOYOTA JIDOSHA KABUSHIKI KAISHA, Toyota (JP)

(72) Inventors: Sho Hashimoto, Susono (JP); Satoshi Nakamura, Shizuoka-ken (JP); Tomoki Somiya, Okazaki (JP); Kazumasa Harada, Nagakute (JP); Hiroki Yabushita, Toyota (JP); Sei Miyazaki, Susono (JP); Yuki Nishikawa, Numazu (JP); Noriaki Hasegawa, Izunokuni (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 79 days.

(21) Appl. No.: 18/586,623

(22) Filed: Feb. 26, 2024

(65) Prior Publication Data

US 2024/0286605 A1    Aug. 29, 2024

(30) Foreign Application Priority Data

Feb. 28, 2023    (JP) .................................. 2023-029992

(51) Int. Cl.
*B60W 30/09* (2012.01)
*B60W 60/00* (2020.01)

(52) U.S. Cl.
CPC ........ *B60W 30/09* (2013.01); *B60W 60/0011* (2020.02)

(58) Field of Classification Search
None
See application file for complete search history.

(56) References Cited

U.S. PATENT DOCUMENTS

| | | | |
|---|---|---|---|
| 2017/0197506 A1* | 7/2017 | Inomata | B60W 30/09 |
| 2019/0079513 A1* | 3/2019 | Greenfield | B60W 50/029 |
| 2020/0298871 A1* | 9/2020 | Mukai | B60W 50/14 |
| 2021/0107521 A1 | 4/2021 | Fujita et al. | |
| 2021/0107528 A1 | 4/2021 | Fujita et al. | |
| 2021/0146956 A1 | 5/2021 | Fujita et al. | |
| 2021/0146958 A1 | 5/2021 | Tanaka et al. | |
| 2021/0237751 A1* | 8/2021 | Ochida | B60W 60/00186 |
| 2021/0245806 A1 | 8/2021 | Suzuki et al. | |

FOREIGN PATENT DOCUMENTS

| | | |
|---|---|---|
| JP | 2021-062780 A | 4/2021 |
| JP | 2021-123146 A | 8/2021 |

* cited by examiner

*Primary Examiner* — Anshul Sood
(74) *Attorney, Agent, or Firm* — SoraIP, Inc.

(57) ABSTRACT

A vehicle includes an interface unit and a preventive safety device. The preventive safety device includes a performance evaluation unit that performs evaluation of driving performance of the autonomous driving kit, and a suppression unit that suppresses a cancel signal output from the autonomous driving kit to cancel the preventive safety function based on the evaluation of the driving performance.

7 Claims, 1 Drawing Sheet

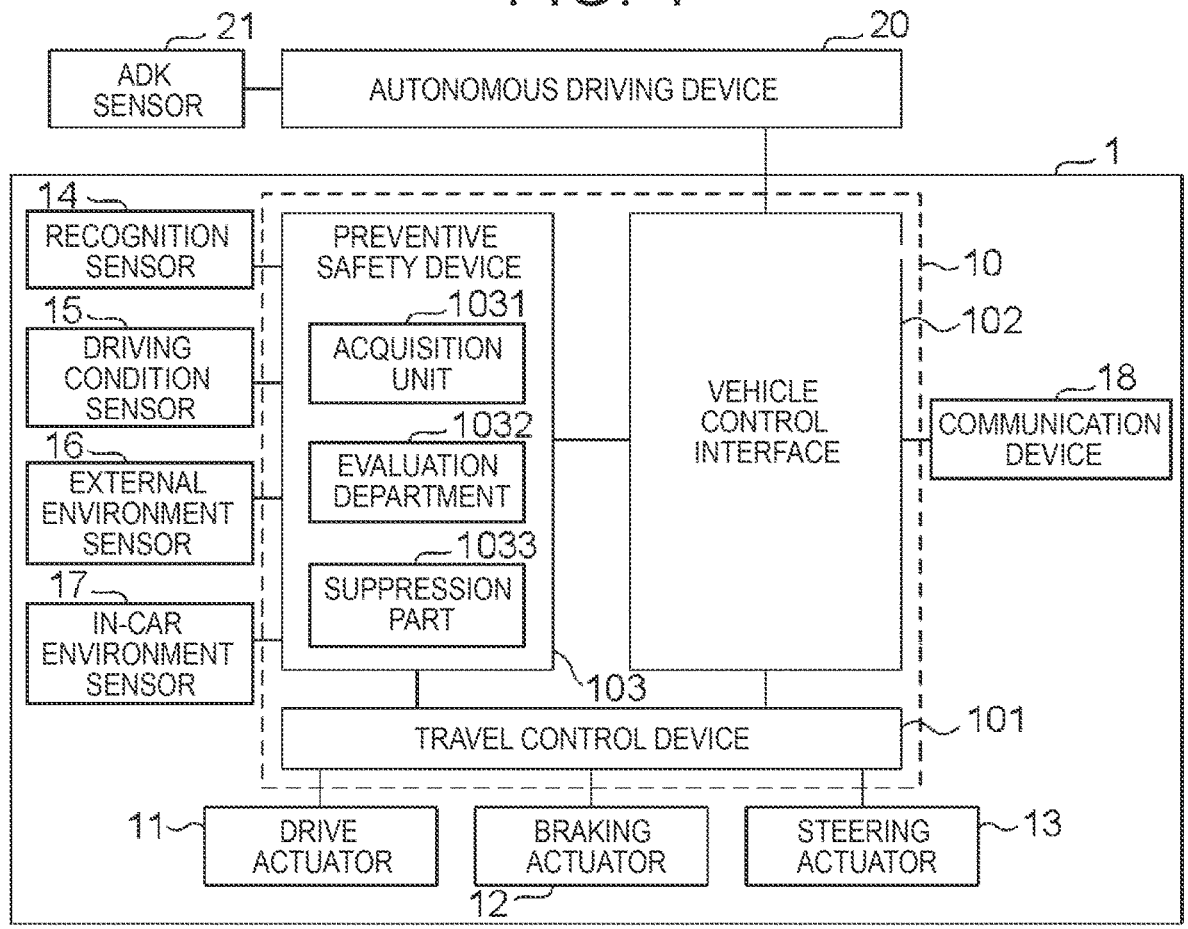
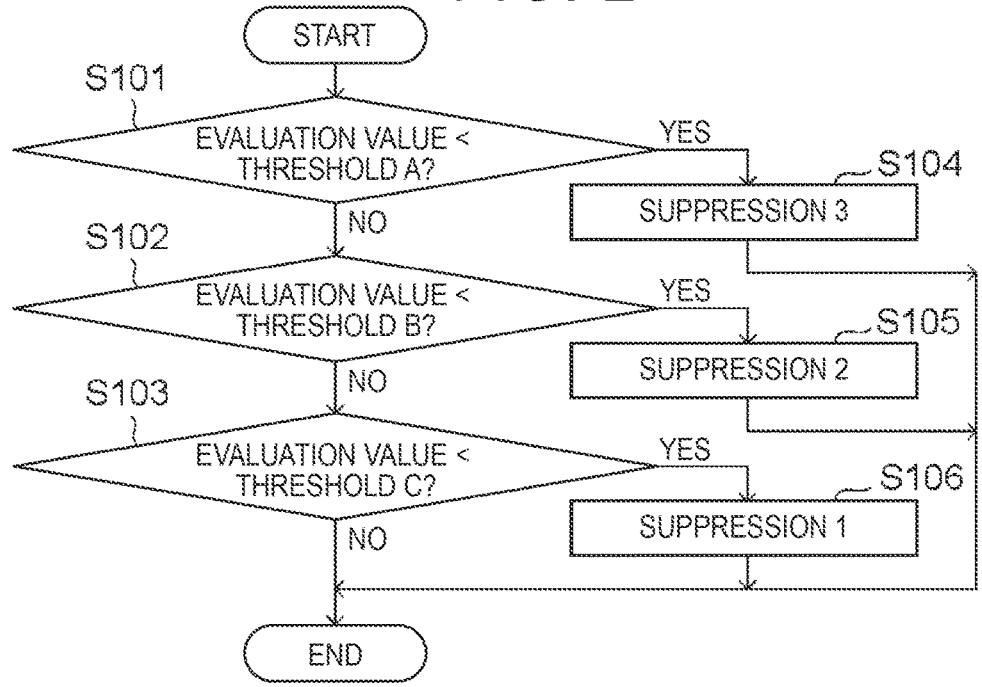

VEHICLE

CROSS-REFERENCE TO RELATED APPLICATION

This application claims priority to Japanese Patent Application No. 2023-029992 filed on Feb. 28, 2023 incorporated herein by reference in its entirety.

BACKGROUND

1. Technical Field

The present disclosure relates to the technical field of vehicles.

2. Description of Related Art

For example, a vehicle has been proposed that is autonomously driven by control instructions being output to functional units of the vehicle according to instructions from a detachable autonomous driving kit for a vehicle (Japanese Unexamined Patent Application Publication No. 2021-123146 (JP 2021-123146 A)). A vehicle control system has also been proposed that includes a first unit that generates a target trajectory based on a vehicle travel plan, and a second unit that performs vehicle travel control so that the vehicle follows the target trajectory. The second unit of the vehicle control system intervenes in a travel controlled variable so as to prevent a collision between the vehicle and an obstacle (see Japanese Unexamined Patent Application Publication No. 2021-062780 (JP 2021-062780 A)).

SUMMARY

When the distance between the vehicle being autonomously driven by the autonomous driving kit and the obstacle is shortening, control that avoids a collision between the vehicle and the obstacle may be performed automatically by a function provided in the vehicle. In order to avoid the vehicle from approaching one obstacle (for example, a pedestrian), the autonomous driving kit may control the vehicle to intentionally approach another obstacle (for example, a fence). In this case, the autonomous driving kit may output a cancel command to cancel the control by the function provided in the vehicle so that the function provided in the vehicle does not interfere with the control by the autonomous driving kit. Incidentally, there is a possibility that an abnormality may occur in the function of the autonomous driving kit. Therefore, it is problematic from a safety perspective that the cancel command output from the autonomous driving kit always takes priority over the control by the function provided in the vehicle.

The present disclosure was made in view of the above problem, and an object of the present disclosure is to provide a vehicle that can suppress a cancel command when there is a possibility of an abnormality being occurred in a function of an autonomous driving kit.

A vehicle according to an aspect of the present disclosure is a vehicle including an interface unit and a preventive safety device. The interface unit is configured to be able to communicate with an autonomous driving kit configured to be attachable to and detachable from the vehicle. The interface unit gives a control instruction related to autonomous driving control to each part of the vehicle based on an instruction from the autonomous driving kit. The preventive safety device implements a preventive safety function of the vehicle. Here, the preventive safety device includes a performance evaluation unit that performs evaluation of driving performance of the autonomous driving kit. The preventive safety device includes a suppression unit that suppresses a cancel signal output from the autonomous driving kit to cancel the preventive safety function based on the evaluation of the driving performance.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a block diagram showing the configuration of a vehicle according to an embodiment; and FIG. 2 is a flowchart illustrating an example of the operation of the preventive safety device according to the embodiment.

DETAILED DESCRIPTION OF EMBODIMENTS

An embodiment related to a vehicle will be described with reference to FIGS. 1 and 2.

Vehicle Configuration

In FIG. 1, a vehicle 1 includes a travel control system 10, a drive actuator 11, a brake actuator 12, a steering actuator 13, a recognition sensor 14, a travel state sensor 15, an external environment sensor 16, an in-vehicle environment sensor 17, and a communication device 18. Note that the vehicle 1 does not need to include the external environment sensor 16 and the in-vehicle environment sensor 17.

An autonomous driving device 20 is connected to the vehicle 1. The autonomous driving device 20 is a device that is detachable from the vehicle 1 and is independent from the vehicle 1. The autonomous driving device 20 may be wired to the travel control system 10 through a detachable connector. Here, the travel control system 10 is a system specific to the vehicle 1. The travel control system 10 is provided together with the vehicle 1 by an automobile manufacturer. In contrast, the autonomous driving device 20 is often designed and developed by a separate entity from the travel control system 10. Note that the autonomous driving device 20 may be referred to as an Autonomous Driving Kit (ADK).

The travel control system 10 and the autonomous driving device 20 may configure an autonomous driving system for autonomously driving the vehicle 1. Note that "autonomous driving" may mean, for example, autonomous driving at level 3 or higher in the level definition of the Society of Automotive Engineers (SAE).

Travel control system 10 may include one or more processors and memory coupled to the processors. The travel control system 10 may be electrically connected with in-vehicle actuators (e.g., drive actuator 11, brake actuator 12, and steering actuator 13), on-vehicle sensors (e.g., recognition sensor 14, travel state sensor 15, external environment sensor 16, and in-vehicle environment sensor 17), and a communication device 18 through an in-vehicle network (e.g., Controller Area Network (CAN)).

The drive actuator 11 is an actuator for accelerating the vehicle 1. The brake actuator 12 is an actuator for decelerating or stopping the vehicle 1. Steering actuator 13 is an actuator for steering the vehicle 1.

The recognition sensor 14 may include at least one of a camera (i.e., an image sensor) and a radar sensor (e.g., millimeter wave radar, laser radar). The recognition sensor 14 is used to detect objects (for example, vehicles, pedestrians, bicycles, and fallen objects) existing around the vehicle 1 and to measure the relative position and velocity of the detected object with respect to the vehicle 1. The recognition sensor 14 may include a position detection device that detects the position of the vehicle 1. Note that the position detection device may be a Global Positioning System (GPS) sensor.

The travel state sensor 15 may include at least one of a speed sensor, an acceleration sensor, and a yaw rate sensor. The travel state sensor 15 is used to measure at least one of a physical quantity (e.g., speed, acceleration, yaw rate) and a parameter indicating the running state of the vehicle 1. The external environment sensor 16 is a sensor that acquires information regarding the external environment of the vehicle 1. External environment sensor 16 may include at least one of a raindrop sensor and a temperature sensor. The in-vehicle environment sensor 17 is a sensor that acquires information regarding the in-vehicle environment of the vehicle 1. The in-vehicle environment sensor 17 may include at least one of a camera, a temperature sensor, and a pressure sensor.

The communication device 18 is a device for the vehicle 1 to perform data communication with the outside. The communication device 18 may be connected to an external communication network by wireless communication. Therefore, the vehicle 1 may be a so-called connected car.

The travel control system 10 includes a travel control device 101, a vehicle control interface 102, and a preventive safety device 103 as logically realized functional blocks or physically realized processing circuits. Note that the travel control device 101, vehicle control interface 102, and preventive safety device 103 will be described later.

The autonomous driving device 20 is electrically coupled to the ADK sensor 21. The ADK sensor 21 may be configured integrally with the autonomous driving device 20. The ADK sensor 21 may be detachably attached to the autonomous driving device 20 or the vehicle 1. The ADK sensor 21 is a sensor for acquiring information necessary for the autonomous driving device 20 to drive the vehicle 1. For example, ADK sensor 21 may include a camera, a radar sensor, and a GPS sensor.

The autonomous driving device 20 may have a function of formulating a travel plan. The autonomous driving device 20 may calculate a target trajectory on which the vehicle 1 will travel based on the created travel plan and the information acquired by the ADK sensor 21. For example, the target trajectory may include a sequence of points indicating a plurality of target positions of the vehicle 1, and at least one of a target speed and a target acceleration at each of the plurality of target positions. The autonomous driving device 20 transmits the calculated target trajectory to the travel control system 10. Note that the autonomous driving device 20 may repeatedly calculate the target trajectory and transmit the calculated target trajectory to the travel control system 10 at a predetermined period.

The target trajectory transmitted from the autonomous driving device 20 is input to the travel control device 101 via the vehicle control interface 102 of the travel control system 10. For example, the travel control device 101 determines the drive control amount to be instructed to the drive actuator 11, the brake control amount to be instructed to the brake actuator 12, and the steering actuator 13 based on the target trajectory and the measurement results of the travel state sensor 15. At least one of the steering control amounts to be instructed is calculated.

The preventive safety device 103 is a device that intervenes in the travel control device 101 to prevent or avoid a collision between the vehicle 1 and an object. Control to prevent or avoid a collision between the vehicle 1 and an object includes control to prevent the vehicle 1 from departing from the lane (e.g., lane departure prevention control, lane keeping support control), control to keep the distance between the vehicle 1 and the preceding vehicle constant (e.g., inter-vehicle distance control), and control to automatically 20 apply braking force to the vehicle 1 when there is a high possibility of a collision between the vehicle 1 and an object (e.g., collision damage reduction brakes).

An example of a method for the preventive safety device 103 to intervene in the travel control device 101 is a method in which the preventive safety device 103 gives an intervention control amount to the travel control device 101. In this case, the intervention control amount may include at least one of a drive control amount, a braking control amount, and a steering control amount. When the preventive safety device 103 gives the travel control device 101 an intervention control amount, the travel control device 101 calculates the control amount calculated from the target trajectory (specifically, the drive control amount, braking control amount, and steering control amount). Priority is given to the intervention control amount over at least one of the following. The travel control device 101 controls at least one of the drive actuator 11, the brake actuator 12, and the steering actuator 13 according to the intervention control amount.

By the way, the autonomous driving device 20 detects objects existing around the vehicle 1 based on information acquired by the ADK sensor 21. Then, the autonomous driving device 20 calculates a target trajectory so that the vehicle 1 does not collide with the detected object. Therefore, theoretically, the travel control device 101 controls the control amount (specifically, at least one of the drive control amount, the braking control amount, and the steering control amount) according to the target trajectory calculated by the autonomous driving device 20. If calculated, a collision between the vehicle 1 and the object will not occur. However, due to some abnormality occurring in the autonomous driving device 20, the driving performance of the autonomous driving device 20 may permanently or temporarily deteriorate. Therefore, the preventive safety device 103 may operate as a last resort to prevent or avoid a collision between the vehicle 1 and an object.

On the other hand, the autonomous driving device 20 may intentionally calculate the target trajectory so that the vehicle 1 approaches an object. At this time, if the preventive safety device 103 operates and intervenes in the travel control device 101, the vehicle 1 will not be able to travel along the target trajectory calculated by the autonomous driving device 20. In order to cancel the intervention of the preventive safety device 103 in the travel control device 101, the autonomous driving device 20 can output a cancel signal including a cancel command. Note that a signal indicating that the preventive safety device 103 intervenes in the travel control device 101 may be transmitted to the autonomous driving device 20 via the vehicle control interface 102. The autonomous driving device 20 may recognize that the preventive safety device 103 intervenes in the travel control device 101 based on the signal.

The cancellation signal output from the autonomous driving device 20 is input to the preventive safety device 103 via the vehicle control interface 102. When a cancel signal is input to the preventive safety device 103, the preventive safety device 103 sends an intervention stop control signal to the travel control device 101 to cancel the intervention control amount given to the travel control device 101 from the preventive safety device 103. Enter.

Performance Evaluation Method

From the viewpoint of preventive safety, the preventive safety device 103 has a function as a performance evaluation device that evaluates the driving performance of the autonomous driving device 20. In other words, there is a possibility that some kind of abnormality will occur in the autonomous driving device 20. When some kind of abnormality occurs in the autonomous driving device 20, it is not appropriate for the intervention of the preventive safety device 103 to the travel control device 101 to be canceled due to the cancel signal output from the autonomous driving device 20. Therefore, the preventive safety device 103 is provided with a function as a performance evaluation device.

The preventive safety device 103 may evaluate the driving performance of the autonomous driving device 20 based on information obtained from at least one of the recognition sensor 14, the travel state sensor 15, the external environment sensor 16, and the in-vehicle environment sensor 17.

An example of how the preventive safety device 103 evaluates the driving performance of the autonomous driving device 20 will be described below. Note that the method for evaluating driving performance is not limited to the method described below. In the following, it is assumed that the evaluation of the driving performance of the autonomous driving device 20 is expressed by a numerical value (that is, an evaluation value).

For example, the acquisition unit 1031 of the preventive safety device 103 determines the relationship between the vehicle 1 and objects existing around the vehicle 1 (e.g., relative position, relative speed, etc.) based on information obtained from the recognition sensor 14. You may obtain the information shown. For example, the evaluation unit 1032 of the preventive safety device 103 may reduce the evaluation value related to the driving performance of the autonomous driving device 20 by a predetermined value, when the vehicle 1 is approaching one object and when the distance between the vehicle 1 and the object becomes shorter than a predetermined distance, based on the information acquired by the acquisition unit 1031.

For example, the acquisition unit 1031 may acquire the current running state (for example, speed, acceleration, jerk, etc.) of the vehicle 1 based on information obtained from the travel state sensor 15 or the like. For example, the evaluation unit 1032 may reduce the evaluation value related to driving performance by a predetermined value when the speed of the vehicle 1 exceeds the speed limit. For example, the evaluation unit 1032 may reduce the evaluation value related to driving performance by a predetermined value when the acceleration of the vehicle 1 exceeds a predetermined acceleration. For example, when the jerk of the vehicle 1 exceeds a predetermined jerk value, the evaluation unit 1032 may reduce the evaluation value related to driving performance by a predetermined value.

For example, the acquisition unit 1031 may acquire weather-related information based on information obtained from the external environment sensor 16 or the like. For example, when the driving performance is evaluated based on the speed of the vehicle 1, the evaluation unit 1032 changes the reference value (for example, speed limit) with which the speed of the vehicle 1 is compared depending on whether it is a sunny day or a rainy day. You may do so.

For example, the acquisition unit 1031 may acquire information regarding the occupant riding in the vehicle 1 based on information obtained from the in-vehicle environment sensor 17 or the like. For example, the evaluation unit 1032 may reduce the evaluation value related to driving performance by a predetermined value when the occupant has a grim expression or a nervous expression. Note that the facial expression of the occupant may be recognized by performing image processing on an image of the occupant.

For example, the evaluation unit 1032 may evaluate driving performance based on the frequency with which the preventive safety device 103 intervenes in the travel control device 101. For example, the evaluation unit 1032 reduces the evaluation value related to driving performance by a predetermined value when the frequency of execution of lane departure prevention control as an intervention in the travel control device 101 of the preventive safety device 103 exceeds a predetermined frequency. It's fine.

In parallel with the evaluation of the driving performance of the preventive safety device 103 and the autonomous driving device 20 described above, the operation shown in the flowchart of FIG. 2 is performed. In FIG. 2, it is assumed that threshold A is smaller than threshold B, and threshold B is smaller than threshold C (that is, threshold A<threshold B<threshold C). In FIG. 2, "suppression 1", "suppression 2", and "suppression 3" each indicate the response of the preventive safety device 103 when a cancel signal is output from the autonomous driving device 20.

Specifically, "suppression 1" is to lengthen the time required from when the preventive safety device 103 receives the cancel signal until the intervention of the preventive safety device 103 to the travel control device 101 is canceled. It's fine. Here, it is assumed that the autonomous driving device 20 continues to output the cancel signal until the intervention of the preventive safety device 103 to the travel control device 101 is canceled. For example, suppose that the time required from when the preventive safety device 103 receives a cancel signal until the intervention of the preventive safety device 103 to the travel control device 101 is canceled in normal times is 2 seconds (i.e., the autonomous driving device 20 continues to output the cancel signal for at least 2 seconds). In this case, in "suppression 1", the time required until the intervention is canceled may be set to 5 seconds (that is, the autonomous driving device 20 continues to output the cancel signal for at least 5 seconds).

"Suppression 2" is to suppress the intervention control amount (specifically, at least one of the drive control amount, the braking control amount, and the steering control amount) related to the intervention of the preventive safety device 103 to the travel control device 101. It's good. In other words, in "suppression 2", the intervention of the preventive safety device 103 to the travel control device 101 is not canceled, but the degree of the intervention is suppressed. "Suppression 3" may be to discard (in other words, ignore) the cancellation signal from the autonomous driving device 20 and to execute or continue the intervention of the preventive safety device 103 to the travel control device 101.

Compare "suppression 1", "suppression 2" and "suppression 3". In "suppression 1", the cancellation signal cancels the intervention of the preventive safety device 103 to the travel control device 101, so it can be said that the degree of suppression of the cancellation signal is the weakest. In "Suppression 3", the cancellation signal is discarded, so it can be said that the degree of suppression of the cancellation signal is the strongest. In "Suppression 2", the intervention of the preventive safety device 103 in the travel control device 101 is not canceled, but the degree of the intervention is suppressed, so it can be said that the degree of suppression of the cancel signal is moderate.

In FIG. 2, the suppression unit 1033 of the preventive safety device 103 determines whether the evaluation value related to the autonomous driving device 20 is smaller than the threshold A (S101). In the process of S101, if it is determined that the evaluation value related to the autonomous driving device 20 is smaller than the threshold A (S101: Yes), the suppression unit 1033 sets the suppression mode of the cancel signal output from the autonomous driving device 20 to "suppression 3" (S104).

In the process of S101, if it is determined that the evaluation value related to the autonomous driving device 20 is equal to or greater than the threshold A (S101: No), the suppression unit 1033 determines whether the evaluation value related to the autonomous driving device 20 is smaller than the threshold B (S102). In the process of S102, if it is determined that the evaluation value related to the autonomous driving device 20 is smaller than the threshold B (S102: Yes), the suppression unit 1033 sets the suppression mode of the cancel signal output from the autonomous driving device 20 to "suppression 2" (S105).

In the process of S102, if it is determined that the evaluation value related to the autonomous driving device 20 is equal to or higher than the threshold B (S102: No), the suppression unit 1033 determines whether the evaluation value related to the autonomous driving device 20 is smaller than the threshold C (S103). In the process of S103, if it is determined that the evaluation value related to the autonomous driving device 20 is smaller than the threshold C (S103: Yes), the suppression unit 1033 sets the suppression mode of the cancel signal output from the autonomous driving device 20 to "suppression 1" (S106).

In the process of S103, if it is determined that the evaluation value of the autonomous driving device 20 is equal to or greater than the threshold C (S103: No), the operation shown in the flowchart of FIG. 2 is ended. After that, the process of S101 may be performed. In this case, when the autonomous driving device 20 outputs a cancel signal, the intervention of the preventive safety device 103 to the travel control device 101 is canceled.

When the suppression mode of the cancel signal is "suppression 1", "suppression 2", or "suppression 3", the suppression unit 1033 takes the response determined by the suppression mode when the cancellation signal is output from the autonomous driving device 20. I do. Regarding the degree of suppression of the cancellation signal, "suppression 1" is the weakest, "suppression 2" is moderate, and "suppression 3" is the strongest. In FIG. 2, "threshold A<threshold B<threshold C", so it can be said that the lower the evaluation of the driving performance of the autonomous driving device 20 expressed by the evaluation value, the stronger the degree of suppression of the cancel signal.

Technical Effect

If the evaluation of the driving performance of the autonomous driving device 20 is on a downward trend, it is considered that there is a sign that an abnormality occurs in the autonomous driving device 20, or that there is a possibility that an abnormality has occurred in the autonomous driving device 20. In such a case, it is not appropriate for the intervention of the preventive safety device 103 to be canceled in the travel control device 101 by the cancel signal output from the autonomous driving device 20. In this embodiment, the cancel signal output from the autonomous driving device 20 is suppressed according to the evaluation of the driving performance of the autonomous driving device 20. Therefore, when there is a sign that an abnormality has occurred in the autonomous driving device 20 or there is a possibility that an abnormality has occurred in the autonomous driving device 20, the preventive safety device 103 can intervene in the travel control device 101. Therefore, the safety of the vehicle 1 can be ensured. That is, according to this embodiment, when there is a sign that an abnormality occurs in the autonomous driving device 20, or when there is a possibility that an abnormality occurs in the autonomous driving device 20, the cancel signal can be suppressed.

Aspects of the disclosure derived from the embodiment described above will be described below.

A vehicle according to an aspect of the disclosure is a vehicle including an interface unit and a preventive safety device. The interface unit is configured to be able to communicate with an autonomous driving kit configured to be attachable to and detachable from the vehicle. The interface unit gives a control instruction related to autonomous driving control to each part of the vehicle based on an instruction from the autonomous driving kit. The preventive safety device implements a preventive safety function of the vehicle. Here, the preventive safety device includes a performance evaluation unit that performs evaluation of driving performance of the autonomous driving kit. The preventive safety device includes a suppression unit that suppresses a cancel signal output from the autonomous driving kit to cancel the preventive safety function based on the evaluation of the driving performance.

In the embodiment described above, the "autonomous driving device 20" corresponds to an example of an "autonomous driving kit", the "vehicle control interface 102" corresponds to an example of an "interface unit", the "evaluation unit 1032" corresponds to an example of a "performance evaluation unit", and the "suppression unit 1033" corresponds to an example of the "suppression unit".

Suppression of the cancellation signal by the suppression unit may include discarding the cancellation signal and causing the preventive safety function to be executed. Suppression of the cancel signal by the suppression unit may include lengthening the time required from when the preventive safety device receives the cancel signal until the preventive safety function is canceled. The suppression of the cancel signal by the suppression unit may include suppressing the preventive safety function instead of canceling the preventive safety function. The suppression unit may increase the degree of suppression of the cancel signal as the evaluation of the driving performance is lower.

The present disclosure is not limited to the embodiments described above, and can be modified as appropriate within the scope or spirit of the disclosure that can be read from the claims and the entire specification, and vehicles with such modifications may also be modified. This is within the technical scope of the present disclosure.

What is claimed is:
1. A vehicle comprising:
an interface unit; and
a preventive safety device, the interface unit being configured to communicate with an autonomous driving kit configured to be attachable to and detachable from the vehicle, and giving a control instruction related to autonomous driving control to each part of the vehicle based on an instruction from the autonomous driving kit, and the preventive safety device implementing a preventive safety function of the vehicle, wherein
the preventive safety device includes a performance evaluation unit that performs evaluation of driving performance of the autonomous driving kit represented by an evaluation value, and the preventive safety device includes a suppression unit that suppresses a cancel signal output from the autonomous driving kit to cancel the preventive safety function based on the evaluation of the driving performance, wherein the suppression unit executes one of a plurality of suppression operations depending on the evaluation value, including:

a first suppression in which the cancel signal is discarded and the preventive safety function is executed in a case where the evaluation value is smaller than a first threshold;

a second suppression in which, in a case where the evaluation value is greater than or equal to the first threshold and smaller than a second threshold, a control amount of the preventive safety function is suppressed instead of canceling the preventive safety function; and a third suppression in which, in a case where the evaluation value is greater than or equal to the second threshold and smaller than a third threshold, a time required from when the preventive safety device receives the cancel signal until the preventive safety function is canceled is extended, wherein the first threshold is smaller than the second threshold, and the second threshold is smaller than the third threshold.

2. The vehicle according to claim 1, wherein the performance evaluation unit is configured to reduce the evaluation value of the driving performance of the autonomous driving kit by a predetermined amount in a case where the vehicle is approaching an object and a distance between the vehicle and the object becomes shorter than a predetermined distance, based on information obtained from a recognition sensor mounted on the vehicle.

3. The vehicle according to claim 1, wherein the performance evaluation unit is configured to reduce the evaluation value of the driving performance of the autonomous driving kit by a predetermined amount in a case where at least one of (i) a speed of the vehicle exceeding a speed limit, (ii) an acceleration of the vehicle exceeding a predetermined acceleration, and (iii) a jerk of the vehicle exceeding a predetermined jerk value is detected, based on information obtained from a travel state sensor mounted on the vehicle.

4. The vehicle according to claim 1, wherein the performance evaluation unit is configured to change a reference value used to evaluate the driving performance of the autonomous driving kit based on weather-related information obtained from an external environment sensor mounted on the vehicle.

5. The vehicle according to claim 1, wherein the performance evaluation unit is configured to reduce the evaluation value of the driving performance of the autonomous driving kit by a predetermined amount in a case where an occupant in the vehicle is determined to have a grim or nervous facial expression, based on information obtained from an in-vehicle environment sensor that performs image processing on an image of the occupant.

6. The vehicle according to claim 1, wherein the performance evaluation unit is configured to reduce the evaluation value of the driving performance of the autonomous driving kit by a predetermined amount in a case where a frequency at which the preventive safety device performs intervention in a travel control device exceeds a predetermined threshold, the intervention including a lane departure prevention control.

7. The vehicle according to claim 1, wherein the performance evaluation unit is configured to reduce the evaluation value of the driving performance of the autonomous driving kit by a predetermined amount in at least one of the following cases where:

the vehicle is approaching an object and a distance between the vehicle and the object becomes shorter than a predetermined distance, based on information obtained from a recognition sensor mounted on the vehicle, at least one of (i) a speed of the vehicle exceeding a speed limit, (ii) an acceleration of the vehicle exceeding a predetermined acceleration, and (iii) a jerk of the vehicle exceeding a predetermined jerk value is detected, based on information obtained from a travel state sensor mounted on the vehicle, an occupant in the vehicle is determined to have a grim or nervous facial expression, based on information obtained from an in-vehicle environment sensor that performs image processing on an image of the occupant, and a frequency at which the preventive safety device performs intervention in a travel control device exceeds a predetermined threshold, the intervention including a lane departure prevention control.

* * * * *